United States Patent

Blandy et al.

[11] Patent Number: 5,884,080
[45] Date of Patent: Mar. 16, 1999

[54] SYSTEM AND METHOD FOR INSTRUCTION BURST PERFORMANCE PROFILING FOR SINGLE-PROCESSOR AND MULTI-PROCESSOR SYSTEMS

[75] Inventors: Geoffrey Owen Blandy, Austin; Maher Afif Saba, Round Rock, both of Tex.

[73] Assignee: International Business Machines Corporation, Armonk, N.Y.

[21] Appl. No.: 753,569

[22] Filed: Nov. 26, 1996

[51] Int. Cl.$^6$ ........................................ G06F 9/45
[52] U.S. Cl. .............................................. 395/704
[58] Field of Search .............................. 395/704, 183.13, 395/183.14; 702/182, 183, 184, 185, 186, 187

[56] References Cited

U.S. PATENT DOCUMENTS

| | | | |
|---|---|---|---|
| 4,899,275 | 2/1990 | Sachs et al. | 364/200 |
| 5,274,776 | 12/1993 | Senta | 395/375 |
| 5,392,408 | 2/1995 | Fitch | 395/375 |
| 5,457,799 | 10/1995 | Srivastava | 395/700 |
| 5,485,574 | 1/1996 | Bolosky et al. | 395/183.11 |
| 5,515,519 | 5/1996 | Yoshioka et al. | 395/375 |
| 5,539,907 | 7/1996 | Srivastava et al. | 395/700 |
| 5,691,920 | 11/1997 | Levine et al. | 702/186 |
| 5,732,273 | 3/1998 | Srivastava | 395/704 |
| 5,748,855 | 5/1988 | Levine et al. | 395/800.23 |
| 5,748,878 | 5/1998 | Rees et al. | 395/183.14 |
| 5,752,062 | 5/1998 | Gover et al. | 395/183.13 |

*Primary Examiner*—James P. Trammell
*Assistant Examiner*—Peter J. Corcoran, III
*Attorney, Agent, or Firm*—Leslie A. Van Leeuwen; Jeffrey S. LaBaw; George E. Clark

[57] ABSTRACT

The present invention is directed to a system and method for monitoring system performance by sampling instructions in a burst mode, rather than once per interrupt. A burst mode may be configurable for a number of instructions per burst. Furthermore, these instructions are counted using a dynamic tree structure, rather than a log, which results in substantial savings in storage. The present invention requires minimal changes to the operating system, and no changes to application code that is being monitored. No recompilation is necessary to use the present invention. In addition, the present invention provides a system and method for monitoring code segments that are disabled for interrupts, and thus are difficult, if not impossible, to monitor using prior art performance tools. In a multi-processor system, the burst mode is active on all processors at the same time, and each processor has its own dynamic tree structure.

6 Claims, 9 Drawing Sheets

| INSTRUCTION COUNT | % | TASK NAME |
|---|---|---|
| 158330076 | 47.8 | TASK A |
| 68507059 | 21.3 | TASK B |
| 41284504 | 12.9 | TASK C |
| . | . | . |
| . | . | . |

FIG - 8A

| INSTRUCTION COUNT | % | MODULE NAME |
|---|---|---|
| 99632414 | 20.2 | MODULE A |
| 13865068 | 5.6 | MODULE B |
| 5242006 | 3.1 | MODULE C |
| . | . | . |
| . | . | . |

FIG - 8B

MODULE A:

| INSTRUCTION | COUNT |
|---|---|
| I1 | 1200 |
| I2 | 1200 |
| I3 | 800 |
| I4 | 800 |
| I5 | 400 |
| I6 | 1200 |
| . | . |
| . | . |

FIG - 8C

SYSTEM AND METHOD FOR INSTRUCTION BURST PERFORMANCE PROFILING FOR SINGLE-PROCESSOR AND MULTI-PROCESSOR SYSTEMS

BACKGROUND OF THE INVENTION

1. Field of the Invention

The present invention relates to information processing systems and, more particularly, to software tools and methods for monitoring, modeling, and enhancing system performance.

2. Description of Related Art

To enhance system performance, it is helpful to know which modules within a system are most frequently executed. These most frequently executed modules are referred to as "hot" modules. Within these hot modules, it is also useful to know which lines of code are the most frequently executed. When there is a point in the code where one of two or more branches may be taken, it is useful to know which branch is the mainline path, or the branch most frequently taken, and which branch or branches are the exception branches.

A programmer hoping to improve system performance should focus his or her efforts on improving the performance of the hot modules. Improving the performance of the most frequently executed modules will have the most effect on improving overall system performance. It does not make sense to spend much time improving the performance of modules which are rarely executed, as this will have little, if any, effect on the overall system performance.

A programmer hoping to improve the performance of a module will group the instructions in the mainline branches of the module closely together. Keeping the mainline code packed closely together increases the likelihood of cache hits, since the mainline code is the code that will most likely be loaded into the instruction cache.

Performance tools are used to examine program code to determine the most frequently executed modules and instructions in a system. Performance tools may be implemented in hardware or software. Hardware performance tools are usually built into the system. Software performance tools may be built into the system or added at a later point in time. Performance tools implemented in software are especially useful in systems, such as personal computer systems, that do not contain many, if any, built-in hardware performance tools.

Some prior art software performance tools use an interrupt-driven method to monitor performance. Typically, the system is interrupted at set time intervals. At each interrupt, the performance tool samples the code that is running and adds data into a log.

There are several problems with this prior art approach. Because the code is sampled once per interrupt, the programmer never sees any data pertaining to code that is "disabled for interrupts" (i.e. code where interrupts are masked). The interrupt that stops the system and allows the performance monitoring to take place can never occur during code that is disabled for interrupts.

Another problem with this prior art approach is that the storage area quickly fills with data. This means the performance tool can only be run for a very short period of time, or the tool must stop the system to unload the data into another space, such as to disk. Stopping the system is very intrusive, as this type of stop would not occur during normal operations. Thus, stopping the system to unload performance data actually affects the system performance of the system that is being monitored.

Furthermore, sampling once per interrupt gives a ragged view of the performance data. It is difficult to accurately understand what is happening in the system because the performance data is collected at random points. There is no data collected pertaining to a sequence of instructions running in the consecutive order in which they were intended to execute.

Another type of prior art software performance tool keeps track of sequences of instructions by logging every instruction as it executes. However, there are two problems associated with this type of prior art approach. First, the storage area fills with data even more quickly than with the interrupt-driven performance tool. Therefore, this type of tool can only be run for very short periods of time, or the data must be unloaded to another storage area so often that the tool becomes prohibitively intrusive. Second, there is a danger that the data collected will not be representative of the system as a whole. For example, a branch instruction that can take either path one or path two, may take path one during the time the performance tool is monitoring the system. Thus, to the programmer, it will appear that path one is the most frequently executed path. This may or may not be true. It could be that path two is much more frequently executed, but because the performance tool is run for such a short period of time, and because the branch happened to follow path one during the short time the system was monitored, the programmer will be misled.

The recent growth in multi-processor systems has created another problem for both types of prior art performance tools. Prior art performance tools usually use one storage area to collect performance data, regardless of the number of processors in the system. Thus, in a multi-processor system, some type of serialization must be used to ensure that more than one processor is not writing to the storage area at the same time. In addition, this may lead to inaccuracies in the performance data. While one processor is writing its performance data, a second processor may be waiting to write its performance data, and this waiting time will be reflected in the second processor's performance data. This wait time is not part of normal processing.

Another problem with many prior art performance tools implemented in software is that they require changes to be made to both operating system and application code. All code must be recompiled before any performance monitoring takes place. Thus, the changed and recompiled code is the code that is actually monitored, rather than the actual code that eventually becomes part of the final software product.

Consequently, it would be desirable to have a minimally-intrusive system performance tool that would not require a large memory area to store data and that would accurately depict performance for both single and multi-processor systems. It would be desirable to have such a performance tool monitor system performance with minimal changes to the operating system and no changes to application code that is being monitored. In addition, it would be desirable to have such a tool both identify the hot modules within a system and identify the mainline code paths through the system.

SUMMARY OF THE INVENTION

Accordingly, the present invention is directed to a system and method for monitoring system performance by sampling instructions in a burst mode, rather than once per interrupt. A burst mode may be configurable for a number of instructions per burst. Furthermore, these instructions are counted using a dynamic tree structure, rather than a log, which results in substantial savings in storage. With a dynamic tree structure, it is very rare that the performance monitoring process will have to be stopped to unload performance data. The present invention requires minimal changes to the operating system, and no changes to application code. No recompilation is necessary to use the present invention. In addition, the present invention provides a system and method for monitoring code segments that are disabled for interrupts, and thus are difficult, if not impossible, to monitor using prior art performance tools.

In a symmetrical multi-processor embodiment, the burst sampling is active on all processors at the same time. Each processor has its own dynamic tree structure so that the particular instructions executing in different processors may be examined. Thus, it is easy to detect bottlenecks in the system due to a particular instruction or set of instructions being executed on only one processor. Also, no serialization scheme is necessary for memory access.

It is an advantage of the present invention that the most frequently executed modules and code paths are identified in a manner that is minimally-intrusive to the system as a whole, and uses relatively little storage. It is another advantage of the present invention that even code segments that are disabled for interrupts are monitored. It is a further advantage of the present invention that post-processing tools provide several levels of detail regarding the information stored in the dynamic tree structure.

BRIEF DESCRIPTION OF THE DRAWINGS

FIGS. 8A, 8B and 8C are examples of typical output displayed by the present invention.

DETAILED DESCRIPTION OF A PREFERRED EMBODIMENT OF THE INVENTION

Figure 1:
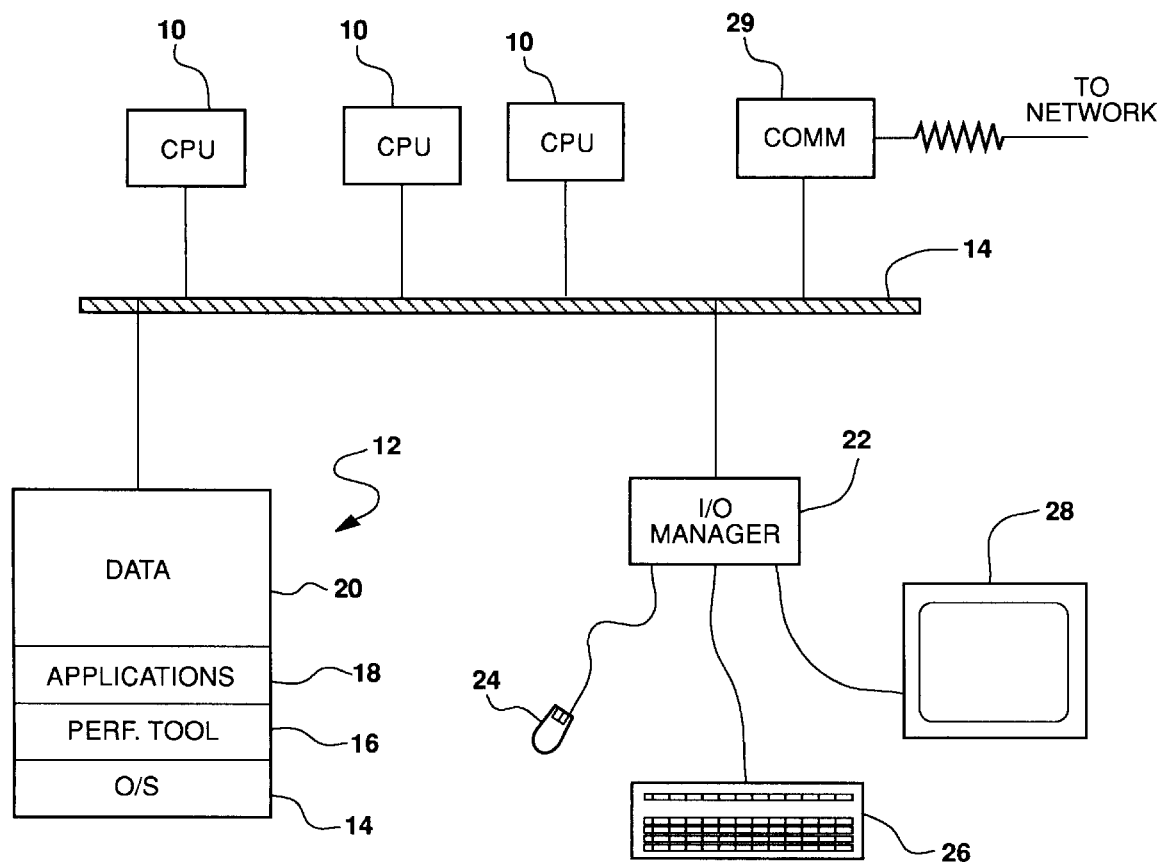
FIG. 1 is a block diagram of an information processing system capable of executing the performance monitoring tool of the present invention.

FIG. 1 is a block diagram of an information handling system embodying the present invention. As shown in FIG. 1, the system includes one or more processors 10. There may be one processor that receives and handles all timer interrupts, or all processors may receive timer interrupts directly. The processors 10 are coupled to system memory 12 via a system bus 14. The system memory 12 consists of random access memory (RAM) which stores the operating system 14, the performance monitoring tool 16, application programs which are executing 18, and associated data 20. The data 20 consists of system data, application program data, and performance monitoring data. The processors are also connected via the bus 14 to a communication adapter 29 for connecting the information handling system to a data processing network, and an input/output (I/O) manager 22. Also connected to the I/O manager 22 are user input devices, such as a mouse 24 and a keyboard 26, and an output device, such as a display 28 which is used by the system to display user input and system output.

The present invention samples, or monitors, programs as they are executing. The programs being monitored may be of any type, including but not limited to operating system programs, kernel programs, utility programs, and application programs. The system is monitored by sampling instructions in burst mode. Rather than monitoring every instruction, performance monitoring is activated to monitor a small group, or burst, of instructions. This certain number, or burst, of instructions is monitored during a burst interval. The performance monitor keeps track of every instruction as it executes through the use of a modified radix tree, as described below with reference to FIG. 6. The performance monitor does not log the entire instruction, or even the entire address of the instruction, as this would use a large amount of memory. Rather, the performance monitor keeps count of instructions as they run, and stores these counts in the radix tree. After running the performance monitor, a user may view several types of output, each giving different levels of system performance information.

Figure 2:
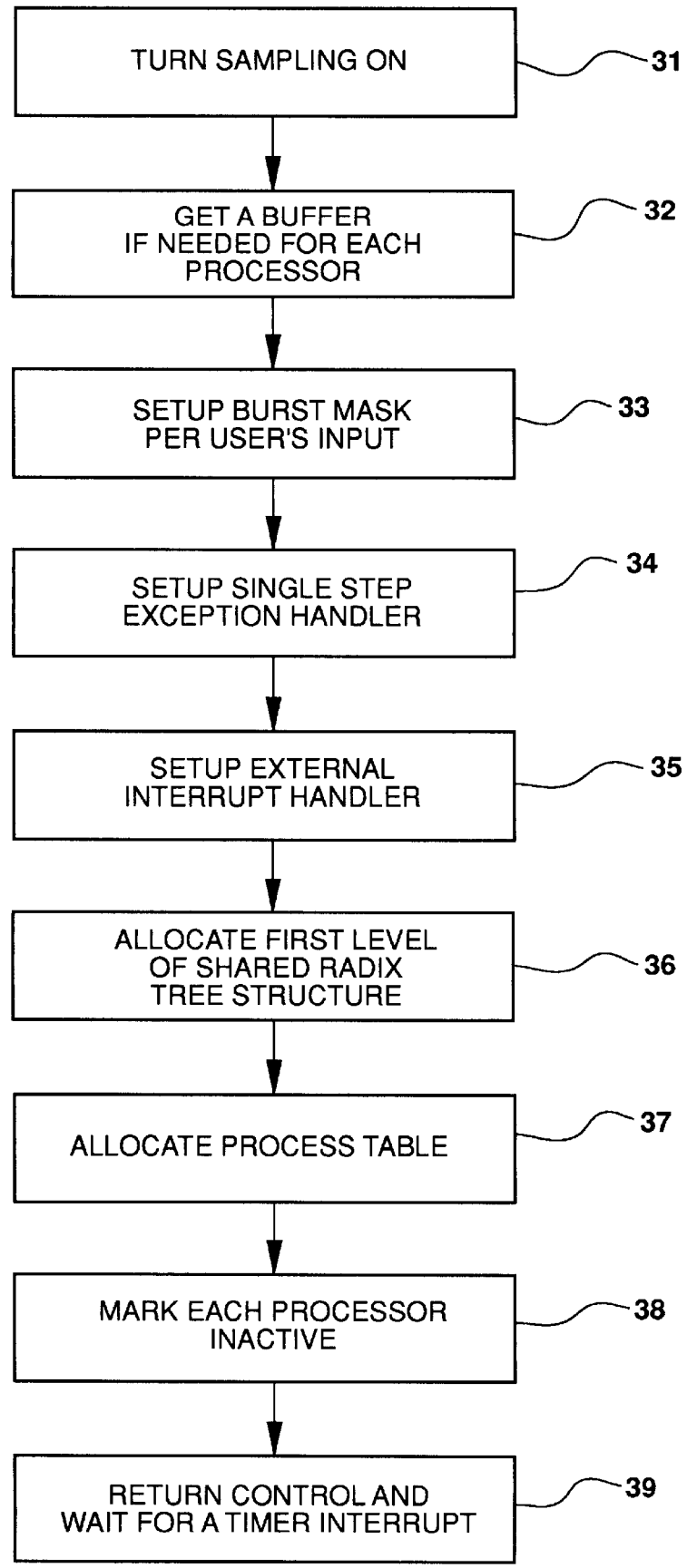
FIG. 2 is a flow chart illustrating how performance monitoring is enabled according to the present invention.

FIG. 2 is a flow chart illustrating how performance monitoring is initiated. Once a user decides to turn sampling on (step 31), the system obtains a buffer for each processor (step 32). Performance data for each processor is stored in that processor's buffer area. Separate buffers also eliminate the need for a locking system, or serialization of memory, in the performance monitor. No processor has to wait to write its performance data to a shared buffer, thus eliminating inaccuracies due to additional wait time (which would not be present during normal processing) being added to a processor's performance data. In addition, adverse hardware effects, such as cross-invalidation, are eliminated by the use of separate memory areas.

A burst mask is then provided (step 33). In the preferred embodiment of the present invention, the burst mask is implemented as a 32-bit number. Each group of four bits represents one interval, where an interval is a number of instructions to be monitored. A burst, or performance monitoring, interval begins when a performance timer interrupt occurs. A number from zero to fifteen may be entered for each interval, and represents the number of instructions (in thousands) to be counted during that interval. This is explained more fully in FIG. 3. The performance monitor begins counting instructions at the beginning of a burst interval (i.e. when a performance timer interrupt occurs), and stops counting, in most cases, when the burst count for the interval is reached. An entry of zero for a particular interval indicates that the performance monitor is idle during that interval, and thus does not count instructions for that interval. When a performance timer interrupt occurs, the performance monitor will use the next four bits of the burst mask to determine the number of instructions to count during that interval. However, if the next four bits are all zeros, this indicates that the performance monitor should not do anything, and should wait until the next performance timer interrupt occurs to check the next four bits of the burst mask. For example, an interval mask of 40201010 (hexadecimal) would tell the performance monitor to count 4000 instructions in the first interval, remain idle for the second interval, count two thousand instructions in the next interval, and so on.

The single step execution handler and external interrupt handler are then set up (steps 34 and 35). More details regarding the operation of the single step execution handler and external interrupt handler are given in FIGS. 3 and 4. The first level of a shared radix tree structure is allocated (step 36). Every processor in the system has at least a level 0 shared table. The shared table is where data regarding shared code will be stored. Many of the instructions in a system are part of what is referred to as shared code. This is usually kernel or operating system code that is used by other programs. Shared code is loaded into one linear virtual address space. More details regarding the structure of the radix tree and the method used to "walk the tree" are given in FIGS. 6 and 7.

A process table is also allocated for each processor (step 37). When a processor encounters a new process during performance monitoring (a process which is not part of the shared code), a process ID (PID) and address of a new level 0 table (i.e. a new radix tree structure for that process) will be entered into the processor's process table.

Each processor is marked inactive (step 38), which means that the burst count for the processor is set to zero. This keeps a processor from inadvertently storing data in the performance tables before monitoring actually starts. The performance monitoring tool is thus enabled, and is waiting for a timer interrupt (step 39) to initiate performance monitoring.

Figure 3:
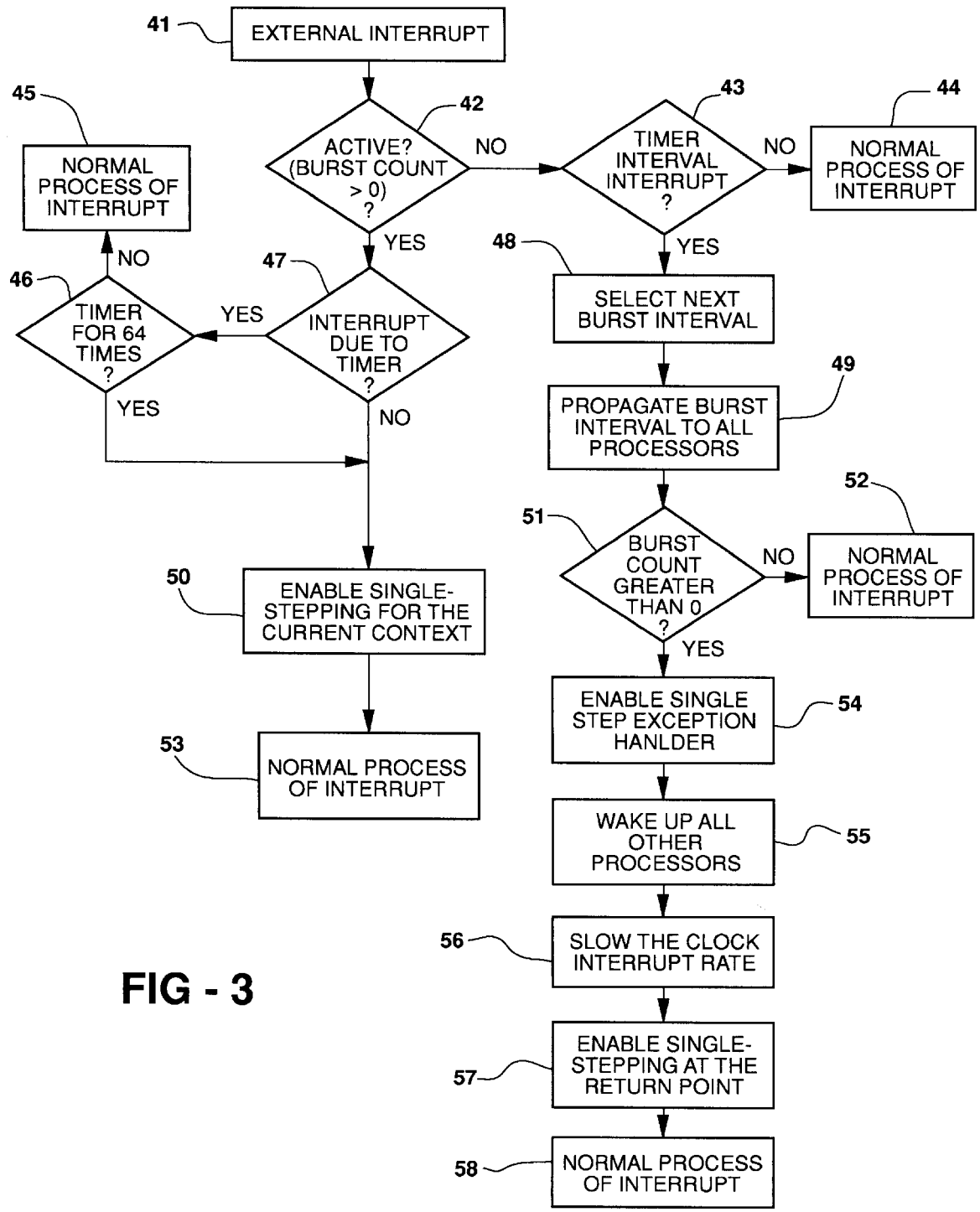
FIG. 3 is a flow chart illustrating the method of handling external interrupts according to the present invention.

FIG. 3 is a flow chart illustrating the events that take place when an external interrupt (step 41) occurs. Note that in the current embodiment of the present invention, there are two timers, a programmable system timer, and a performance timer specifically dedicated to the performance monitor. The current invention could also be implemented in a system with only one timer. When a timer interrupt occurred, a variable could be checked to determine which type of timer interrupt had occurred.

When an external interrupt occurs (step 41), if the performance monitor is not active (step 42) and this is not a performance timer interrupt (step 43), then normal interrupt processing takes place (step 44). However, if the performance monitor is not active (step 42), but this is a performance timer interrupt (step 43), the next burst interval is set up. The next four bits from the interval mask are used to determine the number of instructions to count in this interval (step 48), and this number is propagated to all processors (step 49). If this number happens to be zero (step 51), this means the performance monitor is idle for this interval, and therefore normal interrupt processing takes place (step 52).

If the burst count is greater than zero (step 51), the single step exception handler is enabled (step 54). In the current embodiment of the invention, only one processor receives timer interrupts, and therefore this processor must wake up all other processors (step 55), and the other processors must then enable single-stepping. In an alternate embodiment, all processors would receive the timer interrupts, and thus step 55 would not be necessary.

Next, the system clock, or system timer interrupt rate is "slowed" for the system (step 56). There are several ways that this can be accomplished. One method is to actually reprogram the system clock to interrupt less frequently, that is to wait a longer time between system timer interrupts. Another method is to allow the system timer interrupts to occur as normal, but to have an interrupt handler that ignores the timer interrupts until a predetermined number have occurred. Note that the system clock is not slowed. The system runs at normal functional speeds. The system timer simply interrupts the system less frequently than it normally would. The reason for this is that, although this method of performance monitoring is relatively non-intrusive, it still takes time to add the instruction counts into the radix tree structure. Slowing the rate of system timer interrupts simply takes this additional time into account and prevents the timer interrupt from constantly occurring while the system is being monitored.

In the current embodiment, when an external interrupt occurs during normal processing, single-stepping may be disabled. In this case, single-stepping must be re-enabled at the interrupt return point (step 57) before normal interrupt processing continues (step 58).

If the external interrupt occurs (step 41) and the performance monitor is already active (step 42), the next step is to determine whether the external interrupt is a performance timer interrupt (step 47). If so, and the performance timer has not interrupted for a pre-determined number of times (step 46), then normal interrupt processing takes place (step 45). If the interrupt is not a performance timer interrupt (step 47), or the performance timer has interrupted for the pre-determined number of times, then single stepping is enabled for the current context (step 50), and normal interrupt processing occurs (step 53).

Figure 4:
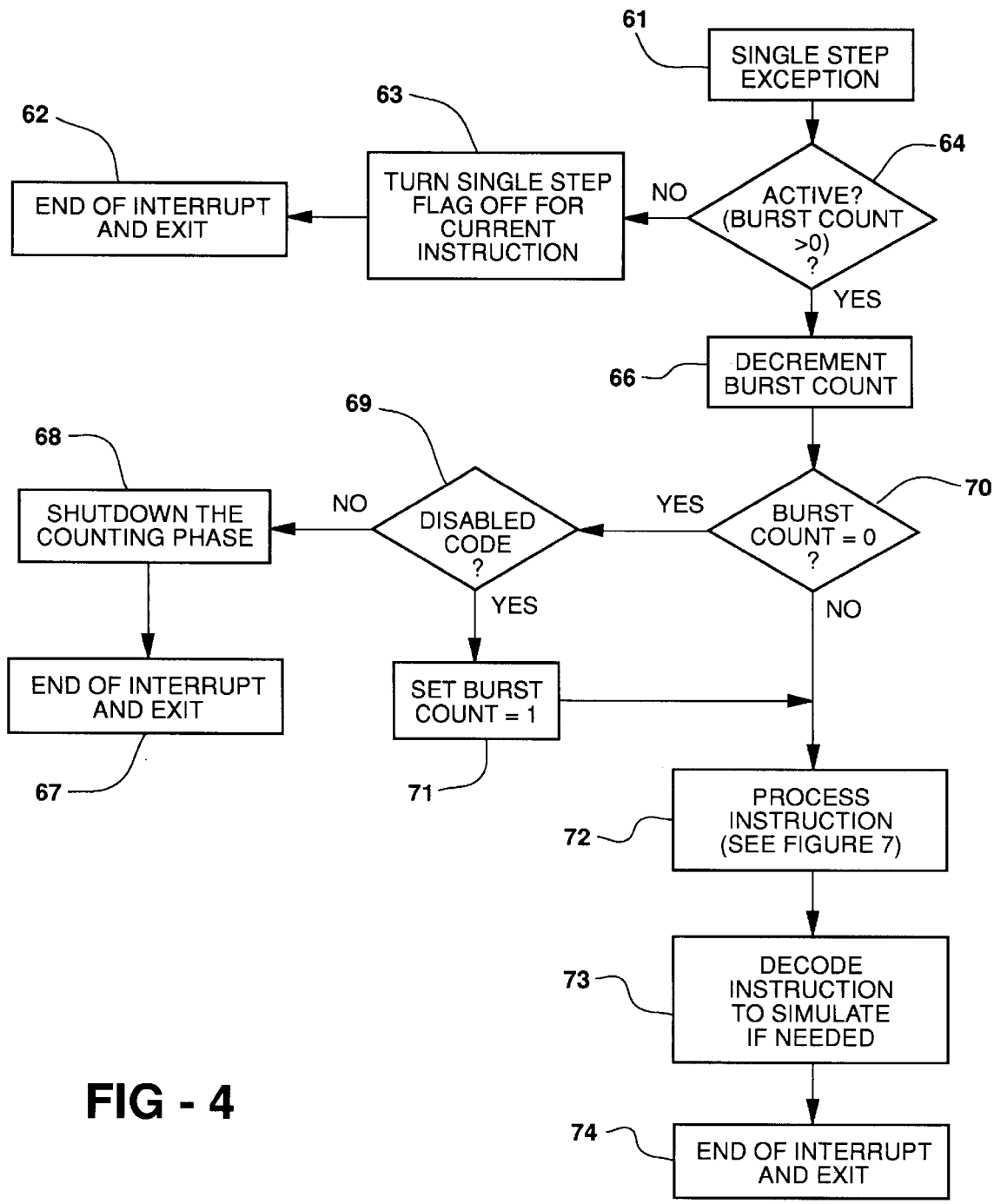
FIG. 4 is a flow chart illustrating the method of single step execution according to the present invention.

FIG. 4 is a flow chart illustrating the events that take place when a single step exception (step 61) occurs. If the performance monitor is not active (step 64), then the single step flag is turned off for the current instruction (step 63) and the interrupt ends (step 62).

If, however, the performance monitor is active (step 64), then the burst count is decremented (step 66). The next step is to determine if the burst counter is equal to zero (step 70). If it is, a determination must be made as to whether the counting phase should be stopped for this interval (steps 68 and 67), or whether the burst count should be forced to remain at one (step 71), so that the performance monitor continues.

This determination is made by looking at whether the code currently being executed is "disabled for interrupt" code (step 69). Disabled for interrupt code is code that does not get interrupted while executing. This means that performance monitoring can never begin during a disabled for interrupt portion of code. Therefore, if a disabled for interrupt section of code is larger than the burst interval, there may be code that is never monitored. To avoid this situation, if the burst count is reached while disabled for interrupt code is executing, the burst count is forced to be one (step 71), and monitoring continues until the disabled code section is complete. This ensures that even code within a large disabled for interrupt code section will be monitored.

If performance monitoring continues (either from step 70 or step 71), the instruction is processed (step 72) and added to the instruction count. Further details of this step are given in FIG. 7. Because some instructions actually cause single stepping to be turned off, each instruction is decoded to see if it is one of these instructions, and if so, single stepping is turned back on (step 73).

Figure 5:
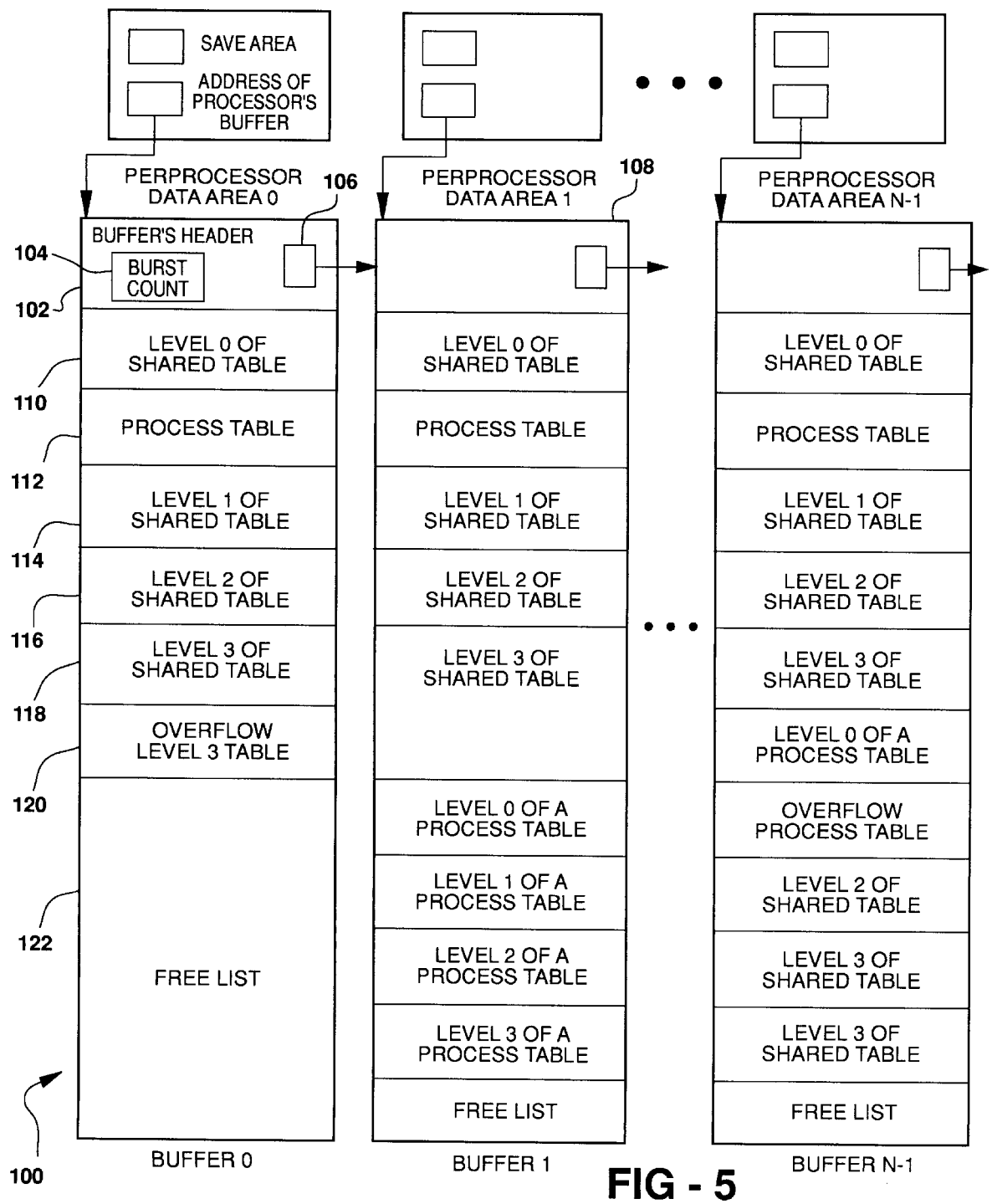
FIG. 5 is a block diagram of the data structures used for storing performance information according to the present invention.
Figure 6:
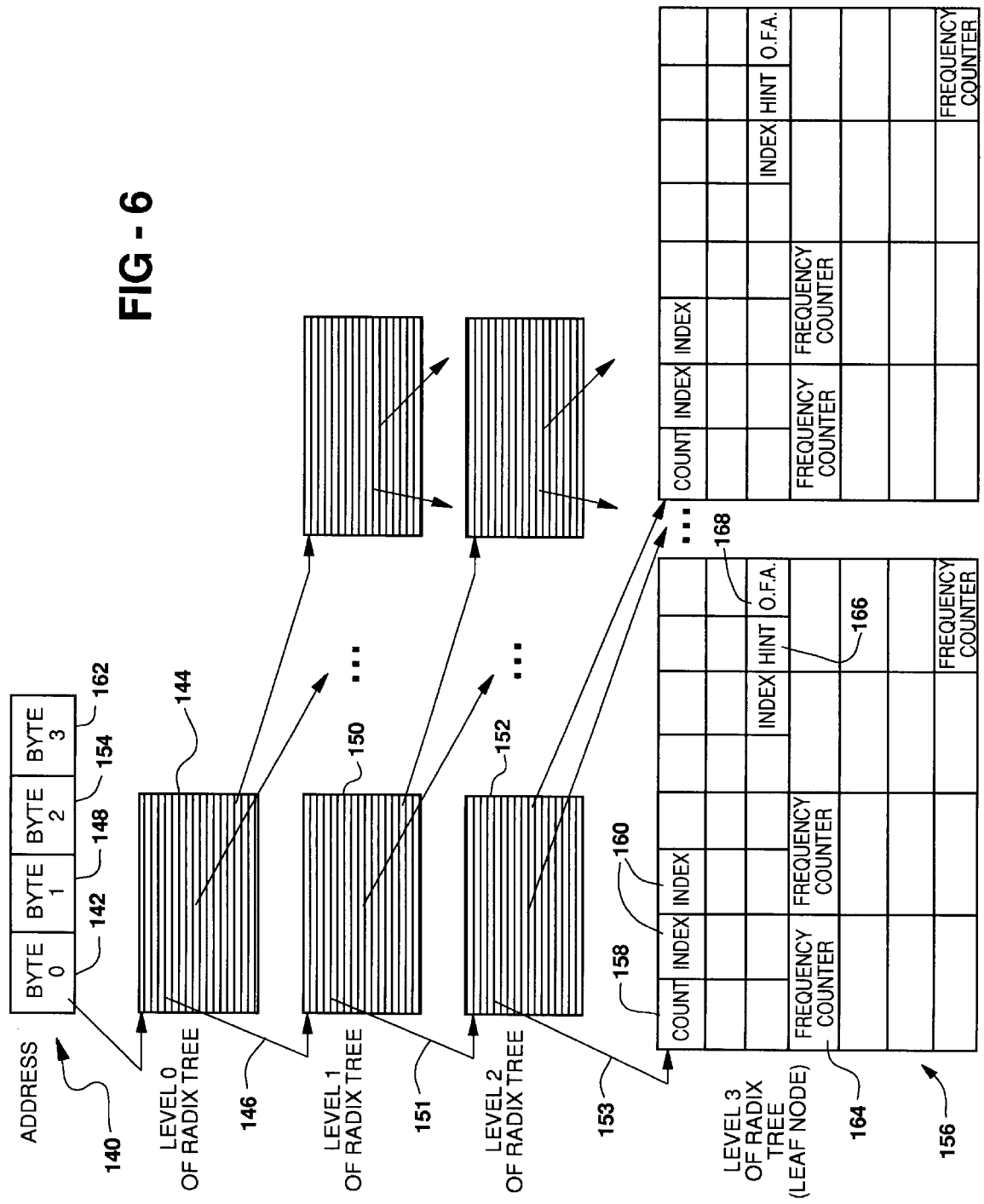
FIG. 6 is a block diagram of the modified radix tree structure according to the present invention.

FIG. 5 depicts the data structure used to store the performance data for each processor. As shown in FIG. 5, each processor has a buffer area in which performance data is stored. If there are n processors in a system, there are n buffers numbered from 0 to n-1. For example, buffer zero 100 is the buffer area reserved for the first processor in FIG. 5. In buffer zero's header area 102, the current burst count 104 is stored, along with a pointer 106 to buffer one's header 108. Each buffer contains a level zero of shared table 110 and a process table 112. In this example, buffer zero 100 also contains a level one of shared table 114, a level two of shared table 116, a level three of shared table 118, and an overflow level three table 120. Level zero 110, level one 114, level two 116, and level three 118 are actually implemented as levels zero, one, two, and three of a radix tree, with level three being a leaf node. The actual details of the radix tree implementation are shown in FIG. 6. There is also free space 122 which can be used as needed to create more tables. For example, if the performance monitor encounters a new process, a level 0 of a process table for that process will be allocated.

FIG. 6 is a block diagram of the modified radix tree structure of the present invention. When the performance monitor encounters an instruction, it increments that instruction's counter in the radix tree. To find the correct counter to increment, the instruction's four-byte address 140 is used. Byte zero 142 is used as a displacement into level zero 144 of the radix tree. At that point in level zero, a pointer 146 is found which points to level one 150. Byte one 148 of the instruction is used as an index into the level one of radix tree 150. At that point in level one 150 there is a pointer 151 to level two of the radix tree 152. Byte two 154 is used as an index into level two 152. At that point in level two there is a pointer 153 to level three of the radix tree 156.

Level three of a radix tree 156 is also called a leaf node. Actual instruction counts are preferably kept in a leaf node. A leaf node is set up as follows. The first entry, count 158, is the number of different instructions for which data is stored in this leaf node. A count of zero means one instruction, a count of one means two instructions, and so on. After the count field 158, there are one or more index fields 160. In the current implementation, there are 50 index fields. The first index field 160 contains byte three 162 of the first instruction encountered and tracked at this leaf node. A frequency counter 164 corresponds to index 160. The frequency counter 164 contains the number of times the instruction has been encountered. A frequency of zero means the instruction has been encountered once, a frequency of one means the instruction has been encountered twice, and so on.

The leaf node also contains a hint 166. A hint 166 is the array element number of the next instruction immediately following the instruction just counted. For example, a hint of 32 tells the performance monitor to go to the thirty-second index entry in the leaf node. Since most instructions are executed in the same pattern or order, the hint 166 can allow the performance monitor to take a shortcut while walking the radix tree (this will be shown in FIG. 7). The hint is most useful after the code has been executed at least once, and the leaf is thus populated with indexes. The leaf node also contains an overflow anchor 168. The overflow anchor 168 is a pointer which points to an overflow table, which is a table created in the event that all fifty indexes are used in a particular leaf node, and more storage is needed.

Figure 7A:
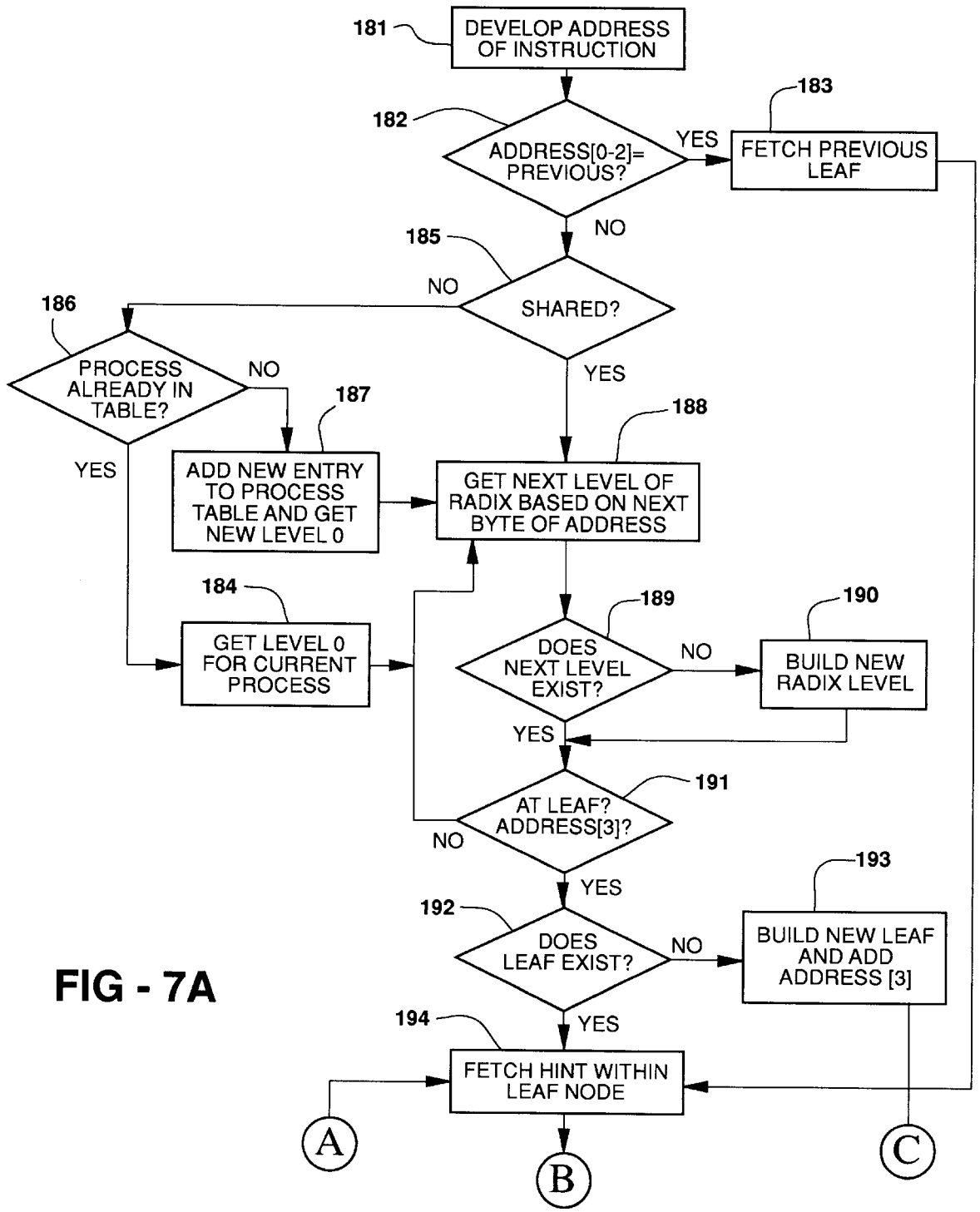
FIG. 7 is a flow chart illustrating the method of storing performance data in a radix tree according to the present invention.
Figure 7B:
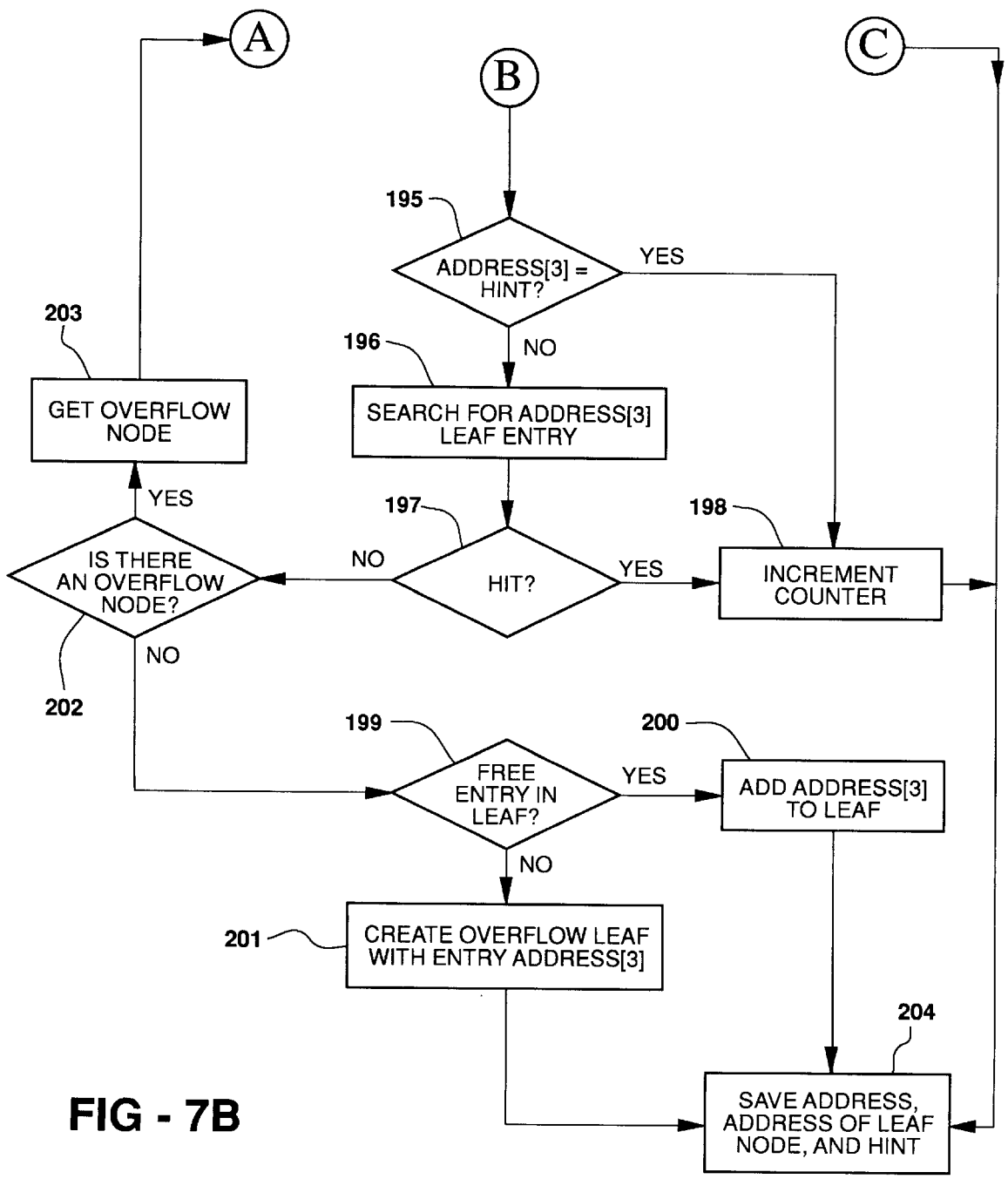

FIG. 7 is a flow chart illustrating the method used to walk the radix tree and store instruction counts. First, the 32-bit flat address of the instruction must be developed (step 181). In some architectures, such as Intel architectures, this step will involve segment register calculations. In other architectures, this may be a much simpler step. Next, the performance monitor attempts to take advantage of a shortcut. If bytes 0 through 2 are the same as the previous instruction encountered (step 182), and the process has not changed (i.e. the process ID is the same, or the previous instruction and the current instruction are both in shared code), then the same leaf node that was just used will be used again (step 183). This is because all addresses with the same bytes 0, 1, and 2 are contained within the same 256-bit address space represented by a single leaf node.

If bytes 0 through 2 are not the same as the previous instruction (step 182), then a determination is made as to whether the current instruction is in shared code (step 185). If not, either the level 0 table for the current process will be obtained (steps 186 and 184), or a new entry will be added to the process table and storage will be allocated for a level 0 table (steps 186 and 187).

The next step is to walk the tree until a leaf node is found for this instruction. The performance monitor uses each byte of the instruction's address to get to the next level of the radix tree for the instruction (step 188). If the next level does not exist (step 189), a new radix level is built (step 190). This process is repeated until the final byte of the instruction's address is reached (step 191). If a leaf node does not exist for this instruction's address (step 192), a new leaf is added (step 193), and the instruction's byte 3 is entered into the first index area of the new leaf node. The count field of the new leaf node remains zero (as discussed above, this means one instruction is in the leaf). The frequency counter for the instruction also remains zero (as this also means the instruction has been encountered once).

If the leaf node already exists (step 192), the performance monitor tries to take advantage of a second shortcut. The hint is examined (step 194) to see if byte 3 of the current instruction is equal to the value in the index field referenced in the hint (step 195). If so, the appropriate counter is incremented (step 198). If not, byte 3 of the current address must be located within the leaf node (step 196). If found (step 197), the appropriate counter is incremented (step 198). If byte 3 is not found in the leaf node (step 197), the performance monitor will add the new entry to a free entry in the leaf (steps 199 and 200), search any overflow nodes (steps 202 and 203), or, if necessary, create an overflow leaf (step 201).

The final step (step 204) is to save the current instruction address, the current leaf address and the hint for use during the next iteration.

FIG. 8A is an example of one type of output a user may choose to view after running the performance monitor. For each task, the total number of instructions executed while that task was in control is given. In addition, the percentage of instructions executed during that task's control is given. For example, there were 158,330,076 instructions executed while TaskA was in control. These instructions represent 47.8% of the total instructions executed while the system was being monitored.

The same type of data may be viewed on a module basis or an instruction basis within a module, as shown in FIGS. 8B and 8C.

There are many other ways in which the performance data may be viewed and used by a user. Post-processing tools may convert assembly code instructions back to higher-level language instructions. The performance data may then be presented to the user in terms of the higher-level language instructions, rather than the assembly code instructions. This would be useful to a programmer who has written code in a higher-level language, as code modifications to improve performance would most likely be done in the higher-level language.

Although the invention has been described with a certain degree of particularity, it should be recognized that elements thereof may be altered by persons skilled in the art without departing from the spirit and scope of the invention. One of the preferred implementations of the invention is as sets of instructions resident in the system memory 12 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area netwrok or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for monitoring system performance in an information handling system, comprising the steps of:

allocating an area in a storage means, for storing performance data;

defining one or more burst counts, wherein each burst count comprises a number of instructions executed during one or more performance monitoring intervals;

during each performance monitoring interval, storing a frequency count in a leaf node of a radix tree structure, for each instruction executed, wherein said frequency count is a number of times said instruction is executed during each performance monitoring interval, and wherein said storing further includes the steps of:

storing a total number of instruction counts contained in a leaf node;

storing one or more indexes, wherein an index is a group of bits that uniquely identify an instruction, and wherein each index is stored in the order in which the instruction associated with each index is encountered;

storing said frequency count associated with each index; and storing a hint, wherein said hint indicates the location of the index associated with a next instruction to be executed; and displaying, for each instruction executed, said frequency count on a display device.

2. A method for monitoring system performance in accordance with claim 1 wherein indexes are only stored for instructions which are executed.

3. A system for monitoring performance of an information handling system, comprising:

one or more processors;

a storage area, for storing performance data;

an operating system for controlling the gathering and storing of said performance data by said one or more processors;

a display device, for viewing said performance data;

means for defining one or more burst counts, wherein each burst count comprises a number of instructions executed during one or more performance monitoring intervals;

during each performance monitoring interval, means for storing a frequency count in a leaf node of a radix tree structure, for each instruction executed, wherein said frequency count is a number of times said instruction is executed during each performance monitoring interval, and wherein said means for storing further includes:

means for storing a total number of instruction counts contained in a leaf node;

means for storing one or more indexes, wherein an index is a group of bits that uniquely identify an instruction, and wherein each index is stored in the order in which the instruction associated with each index is encountered;

means for storing said frequency count associated with each index; and means for storing a hint, wherein said hint indicates the location of the index associated with a next instruction to be executed; and means for displaying, for each instruction executed, said frequency count on said display device.

4. A system for monitoring performance in accordance with claim 3, wherein indexes are only stored for instructions which are executed.

5. A computer-readable medium for monitoring performance of an information handling system, comprising:

means for allocating an area in a storage means, for storing performance data;

means for defining one or more burst counts, wherein each burst count comprises a number of instructions executed during one or more performance monitoring intervals;

during each performance monitoring interval, means for storing a frequency count in a leaf node of a radix tree structure, for each instruction executed, wherein said frequency count is a number of times said instruction is executed during each performance monitoring interval, and wherein said means for storing further includes:

means for storing a total number of instruction counts contained in a leaf node;

means for storing one or more indexes, wherein a index is a group of bits that uniquely identify an instruction, and wherein each index is stored in the order in which the instruction associated with each index is encountered;

means for storing said frequency count associated with each index; and means for storing a hint, wherein said hint indicates the location of the index associated with a next instruction to be executed; and means for displaying, for each instruction executed, said frequency count on a display device.

6. A computer-readable medium for monitoring performance in accordance with claim 5, wherein indexes are only stored for instructions which are executed.

* * * * *